(12) United States Patent
Nakajima et al.

(10) Patent No.: US 8,427,540 B2
(45) Date of Patent: Apr. 23, 2013

(54) IMAGE PICKUP APPARATUS, ON-VEHICLE IMAGE PICKUP APPARATUS, METHOD AND APPARATUS FOR MANUFACTURING IMAGE PICKUP APPARATUS

(75) Inventors: Mitsuru Nakajima, Kanagawa (JP); Hiroshi Takemoto, Kanagawa (JP); Norihiko Sasaki, Iwate (JP); Yasuhiko Andou, Iwate (JP); Shinobu Kanatani, Kanagawa (JP); Hayato Yoshida, Iwate (JP); Kohei Shimizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 442 days.

(21) Appl. No.: 12/731,382

(22) Filed: Mar. 25, 2010

(65) Prior Publication Data
US 2010/0259616 A1 Oct. 14, 2010

(30) Foreign Application Priority Data

Apr. 10, 2009 (JP) .................................. 2009-096010
Dec. 8, 2009 (JP) .................................. 2009-278632

(51) Int. Cl.
*H04N 9/47* (2006.01)
(52) U.S. Cl.
USPC ......................................................... 348/151
(58) Field of Classification Search .................. 348/148, 348/374
See application file for complete search history.

(56) References Cited

U.S. PATENT DOCUMENTS

| | | | |
|---|---|---|---|
| 5,685,358 A * | 11/1997 | Kawasaki et al. ............. | 164/120 |
| 5,715,099 A | 2/1998 | Takemoto | |
| 6,000,784 A | 12/1999 | Takemoto et al. | |
| 6,217,684 B1 | 4/2001 | Morii et al. | |
| 6,224,709 B1 | 5/2001 | Takemoto et al. | |
| 6,472,247 B1 | 10/2002 | Andoh et al. | |
| 6,693,751 B2 | 2/2004 | Morii et al. | |
| 6,795,257 B2 | 9/2004 | Andoh et al. | |
| 6,935,753 B2 * | 8/2005 | Takezawa et al. ............. | 353/119 |
| 7,522,358 B2 * | 4/2009 | Harada et al. ................. | 359/813 |
| 7,540,617 B2 * | 6/2009 | Yamada et al. ................ | 353/38 |
| 7,561,348 B2 | 7/2009 | Nakajima et al. | |
| 7,561,354 B2 * | 7/2009 | Lin .............................. | 359/819 |

(Continued)

FOREIGN PATENT DOCUMENTS

| | | |
|---|---|---|
| EP | 1351316 A2 | 10/2003 |
| EP | 1357780 A2 | 10/2003 |

(Continued)

OTHER PUBLICATIONS

Sep. 30, 2010 European search report in connection with a counterpart European patent application No. 1025062.

*Primary Examiner* — John Follansbee
*Assistant Examiner* — Madhu Woolcock
(74) *Attorney, Agent, or Firm* — Cooper & Dunham LLP

(57) ABSTRACT

A disclosed image pickup apparatus includes a first member holding a lens, and a second member holding an image pickup element converting an image formed via the lens into an electric signal, the second member having an approximately rectangular shape and two approximately arc-shaped location cutout portions at respective diagonal corners of the approximately rectangular shape. In the image pickup apparatus, the first and the second members are bonded via an indirect bonding structure portion where the first and second members are bonded via a fixing member with an ultraviolet curable adhesive and a filler bonding structure portion where the first and second members are bonded by supplying a thermosetting adhesive therebetween.

17 Claims, 18 Drawing Sheets

U.S. PATENT DOCUMENTS

| | | |
|---|---|---|
| 7,609,322 B2 * | 10/2009 | Takada .......................... 348/374 |
| 7,663,694 B2 * | 2/2010 | Kurosawa ..................... 348/374 |
| 7,726,301 B2 * | 6/2010 | Shin et al. ..................... 126/704 |
| 7,746,733 B2 * | 6/2010 | Iijima et al. ................. 369/44.14 |
| 7,980,773 B2 * | 7/2011 | Aoki et al. ................... 396/529 |
| 8,265,479 B2 * | 9/2012 | Imai et al. .................... 396/535 |
| 2002/0003705 A1 | 1/2002 | Tanaka |
| 2002/0114086 A1 * | 8/2002 | Morii et al. .................... 359/811 |
| 2004/0017501 A1 | 1/2004 | Asaga et al. |
| 2004/0027459 A1 | 2/2004 | Segawa et al. |
| 2004/0105134 A1 | 6/2004 | Morii et al. |
| 2004/0202506 A1 * | 10/2004 | Lazic et al. ...................... 403/97 |
| 2006/0044450 A1 | 3/2006 | Wolterink et al. |
| 2007/0182843 A1 | 8/2007 | Shimamura et al. |
| 2007/0219435 A1 | 9/2007 | Segawa et al. |
| 2007/0275505 A1 | 11/2007 | Wolterink et al. |
| 2008/0117486 A1 | 5/2008 | Andoh et al. |
| 2008/0167528 A1 | 7/2008 | Segawa et al. |
| 2009/0103913 A1 * | 4/2009 | Huang .......................... 396/428 |
| 2009/0122422 A1 | 5/2009 | Yoshida et al. |
| 2009/0136263 A1 | 5/2009 | Andoh et al. |
| 2010/0033616 A1 * | 2/2010 | Huang et al. .................. 348/335 |
| 2010/0067080 A1 | 3/2010 | Shimizu et al. |

FOREIGN PATENT DOCUMENTS

| | | |
|---|---|---|
| EP | 1816678 A2 | 8/2007 |
| JP | 2006-80667 | 3/2006 |
| JP | 2007-150708 | 6/2007 |
| WO | WO2004/027880 A2 | 4/2004 |

* cited by examiner

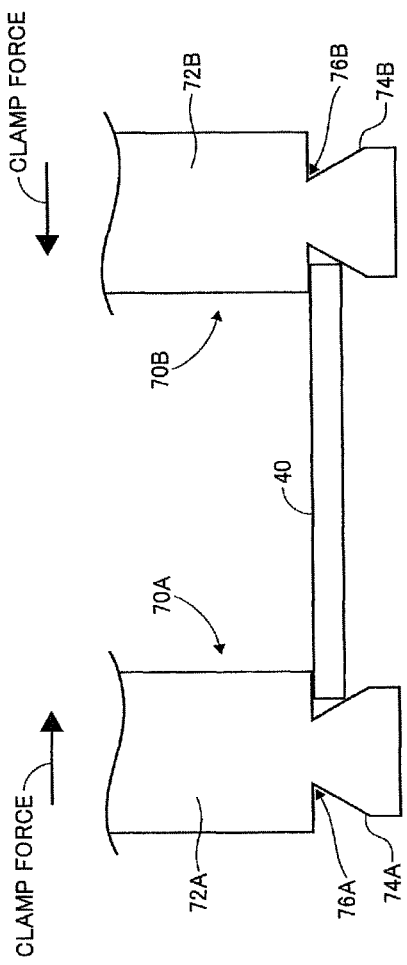

IMAGE PICKUP APPARATUS, ON-VEHICLE IMAGE PICKUP APPARATUS, METHOD AND APPARATUS FOR MANUFACTURING IMAGE PICKUP APPARATUS

BACKGROUND OF THE INVENTION

1. Field of the Invention

The invention relates to an image pickup apparatus and an on-vehicle image pickup apparatus utilized for on-vehicle cameras, digital cameras, digital camcorders, and the like, and a method and an apparatus for manufacturing such image pickup apparatuses.

2. Description of the Related Art

A related art image pickup apparatus having an image pickup lens and an image pickup element such as a Charge Coupled Device (CCD) and a Complementary Metal Oxide Semiconductor (CMOS) Device is widely used in on-vehicle cameras, digital cameras, digital camcorders, and the like.

Such image pickup apparatuses are generally manufactured by a manufacturing apparatus having a fixed unit and a movable unit. In such a manufacturing apparatus, one of a member supporting the lens (lens supporting member) and a member supporting the image pickup element (image pickup element supporting member) is fixed on the fixed unit and the other of the two members is fixed on the movable unit. With this configuration, an optimal position for fixing the two members in order to pickup an image can be determined by moving the movable unit, and then the lens supporting member and the image pickup element supporting member are fixed at the optimal position with an adhesive agent (hereinafter such finding the optimal position for fixing is called a "locating" process).

Japanese Patent Application Publication No. 2006-80667 discloses a technology for manufacturing an image pickup element assembly and an image pickup element assembly used for assembling parts related to such "locating" technology. In this disclosed technology, a fixing member to which an image pick up element is bonded (i.e., the fixing member is indirectly fixed to a lens) includes a clamp unit, via which the fixing member is fixed to a fixture. The clamp unit can be detached from the fixing member. Moreover, in this technology, an suction suctions the image pickup element and transfers it to a predetermined process position of the fixing member.

However, in this technology, a relative positional relationship between the suction and the image pickup element may not be accurately determined. Accordingly, when the manufacturing apparatus supports the lens supporting member and the image pickup element supporting member for locating, an actual relative positional relationship between the lens and the image pickup element may largely deviate from an appropriate relative positional relationship between them. As a result, more time may be required for locating them, resulting in lower productivity.

Further, since recent image pickup elements and substrates supporting them are increasingly reduced in sizes, the image pickup element supporting member such as a substrate may not include a sufficiently large area for suctioning the image pickup element.

SUMMARY OF THE INVENTION

It is a general object of at least one embodiment of the present invention to provide an image pick up apparatus having an accurate relative positional relationship between a lens and an image pickup element, and an apparatus and a method for manufacturing such an image pickup apparatus more efficiently.

According to one embodiment, an image pickup apparatus includes a first member holding a lens, and a second member holding an image pickup element converting an image formed via the lens into an electric signal, the second member having an approximately rectangular shape and two approximately arc-shaped location cutout portions at respective diagonal corners of the approximately rectangular shape. In the image pickup apparatus, the first and the second members are bonded via an indirect bonding structure portion where the first and second members are bonded via a fixing member with an ultraviolet curable adhesive and a filler bonding structure portion where the first and second members are bonded by supplying a thermosetting adhesive therebetween.

According to another embodiment, an image pickup apparatus includes a first member holding a lens, a second member holding an image pickup element converting an image formed via the lens into an electric signal, the first and the second members being bonded. In the image pickup apparatus, the second member has an approximately rectangular shape and includes two approximately arc-shaped location cutout portions at respective diagonal corners thereof.

According to another embodiment, an image pickup apparatus includes a first member holding a lens, and a second member having an approximately rectangular shape and holding an image pickup element converting an image formed via the lens into an electric signal. In the image pickup apparatus, the first and the second members are bonded via an indirect bonding structure portion where the first and second members are bonded via a fixing member with a first adhesive and a filler bonding structure portion where the first and second members are bonded by supplying a second adhesive therebetween.

According to another embodiment, an image pickup apparatus includes a first member holding a lens, and a second member having an approximately rectangular shape and holding an image pickup element converting an image formed via the lens into an electric signal. In the image pickup apparatus, the first and the second members are bonded via an indirect bonding structure portion where the first and second members are bonded via a fixing member having a cross section of an approximately L-shape with a first adhesive and a filler bonding structure portion where the first and second members are bonded by supplying a second adhesive therebetween.

According to another embodiment, an on-vehicle image pickup apparatus includes the above image pickup apparatus.

Other objects, features and advantages of the present invention will become more apparent from the following detailed description when read in conjunction with the accompanying drawings.

BRIEF DESCRIPTION OF THE DRAWINGS

FIGS. 8A and 8B are diagrams illustrating a substrate 40 clamped by two chuck pins 70A and 70B viewed from different directions;

DESCRIPTION OF THE PREFERRED EMBODIMENTS

Preferred embodiments of the invention will be described below with reference to the accompanying drawings.

EMBODIMENTS

First Embodiment

In the following, an image pickup apparatus, and method and apparatus for manufacturing the image pickup apparatus according to a first embodiment are described by referring to the accompanying drawings. The image pickup apparatus according to the first embodiment is provided at a rear portion of a vehicle as an on-vehicle camera, specifically, in the vicinity of a rear bumper or a car registration number plate, so that the on-vehicle camera can capture images of a diagonally downward area behind the vehicle. In this case, images captured by the image pickup apparatus (i.e., on-vehicle camera) are transmitted to an in-vehicle computer per age frame and the transmitted images are displayed on a liquid crystal display (LCD) located in the vehicle.

Note that the image pickup apparatus may be configured as an obstacle detection camera to capture forward areas of the vehicle. Note also that the image pickup apparatus according to the embodiments is not limited to the on-vehicle camera and may be configured as a digital camera or a digital camcorder.

(Configuration)

Figure 1:
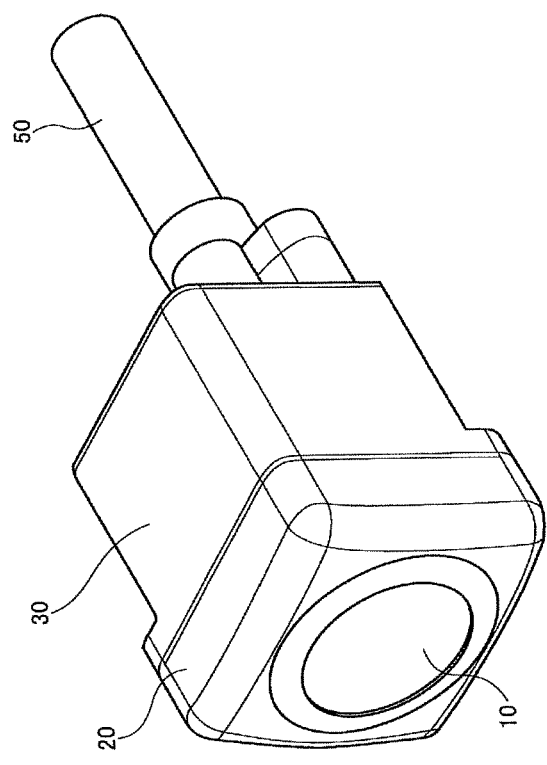
FIG. 1 is a view illustrating an external configuration of an image pickup apparatus 1 according to a first embodiment of the invention.

FIG. 1 is a view illustrating an external configuration of an image pickup apparatus 1 according to the first embodiment of the invention. As illustrated in FIG. 1, the image pickup apparatus 1 includes a lens 10, a lens cell (i.e., first member) 20, a substrate 40 (i.e., second member) described later, a cover 30 covering the substrate 40 and the like, and a connecting cord 50.

Figure 2:
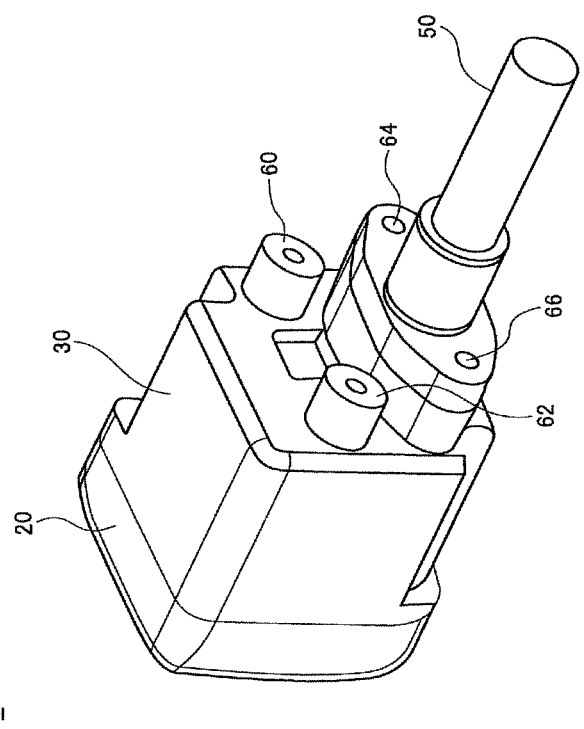
FIG. 2 is a view illustrating the image pickup apparatus 1 viewed from a connecting cord 50 side.

FIG. 2 is a view illustrating the image pickup apparatus 1 viewed from a connecting cord 50 side. As illustrated in FIG. 2, the connecting cord 50 side of the image pickup apparatus 1 includes first threaded screw holes 60 and 62 for fixing the image pickup apparatus 1 to a body of the vehicle, and second threaded screw holes 64 and 66 for fixing the connecting cord 50 to the cover 30.

Figure 3:
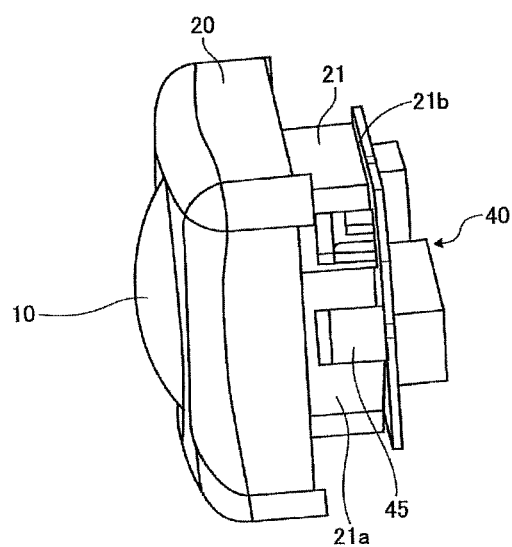
FIG. 3 is a view illustrating the image pickup apparatus 1 from which a cover 30 and the connecting cord 50 are removed.
Figure 4:
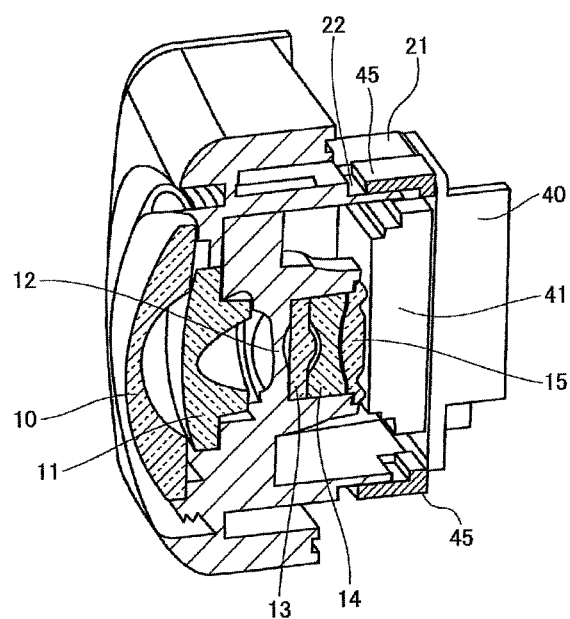
FIG. 4 is a cross-sectional view illustrating the image pickup apparatus 1 from which a cover 30 and the connecting cord 50 are removed.

FIG. 3 is a view illustrating the image pickup apparatus 1 from which the cover 30 and the connecting cord 50 are removed, and FIG. 4 is a cross-sectional view of the image pickup apparatus 1 of FIG. 3. The lens cell 20 is, for example, made of resin and is configured to support six lenses 10 through 15. The lens cell 20 includes a square tube shaped supporting wall 21, in a central portion of which the lenses 10 through 15 are placed, and to a rear end of which a substrate 40 having an image sensor (image pickup element) 41 is bonded. Note that in the following description, an image pickup direction of the image pickup apparatus 1 is defined as a forward area of the image pickup apparatus 1 and a reverse direction of the image pickup direction is defined as a backward area. The image sensor 41 is a solid-state image pickup element having a charge coupled device (CCD) or a complementary metal oxide semiconductor (CMOS) device. The image sensor 41 is configured to carry out photoelectric conversion on an image formed via the lenses 10 through 15, and output the converted image signal to external components such as an in-vehicle computer. The lens cell 20 and the substrate 40 are partially bonded via a fixing member 45 with an ultraviolet (UV) curable adhesive Aa and a thermosetting adhesive Ab that will be described later. Note that the two types of adhesives Aa and Ab are used in the embodiment to prevent the size and weight of the image pickup apparatus 1 from increasing. The fixing member 45 is made of a material having ultraviolet-transmitting properties.

Figure 5:
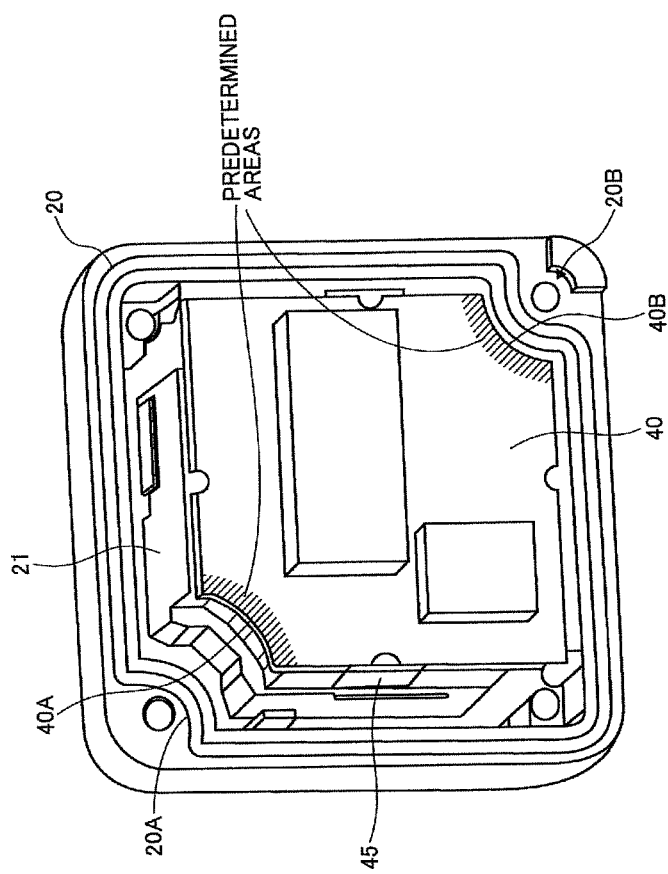
FIG. 5 is a view illustrating the image pickup apparatus 1 from which a cover 30 and the connecting cord 50 are removed.

FIG. 5 is a view illustrating the image pickup apparatus 1 of FIG. 3 viewed from the substrate 40 side. As illustrated in FIG. 5, the substrate 40 has an approximately rectangular shape, and first cutout portions 40A and 40B (first location cutout portions) having an approximately arc shape are formed at two diagonally located corners of the substrate 40. Note that the above approximately arc shape does not indicate a projected type of arc but indicates a recessed type of arc. The substrate 40 also includes other electronic components such as a capacitor or resistor other than the image sensor 41; however, they are not formed in predetermined areas near the first cutout portions 40A and 40B. Note that the image sensor 41 is mounted on a front face 40f of the substrate 40 (see FIG. 10A).

The lens cell 20 includes second cutout portions 20A and 20B (second location cutout portions) corresponding to the first cutout portions 40A and 40B formed in the substrate 40 such that the first and second cutout portions 40A and 20A, and the first and second cutout portions 40B and 200 form a corresponding cylindrical side wall spaces. The cylindrical side wall spaces are provided for allowing two threaded screws to penetrate the lens cell 30 for threadably mounting the cover 30 on the lens cell 20 with the two threaded screws.

Further, the first cutout portions 40A and 40B in the substrate 40 are also used when a later described manufacturing apparatus 90 clamps the substrate 40 having the image sensor 41 in order to bond the substrate 40 on the lens cell 20.

(Manufacturing Process)

Figure 6:
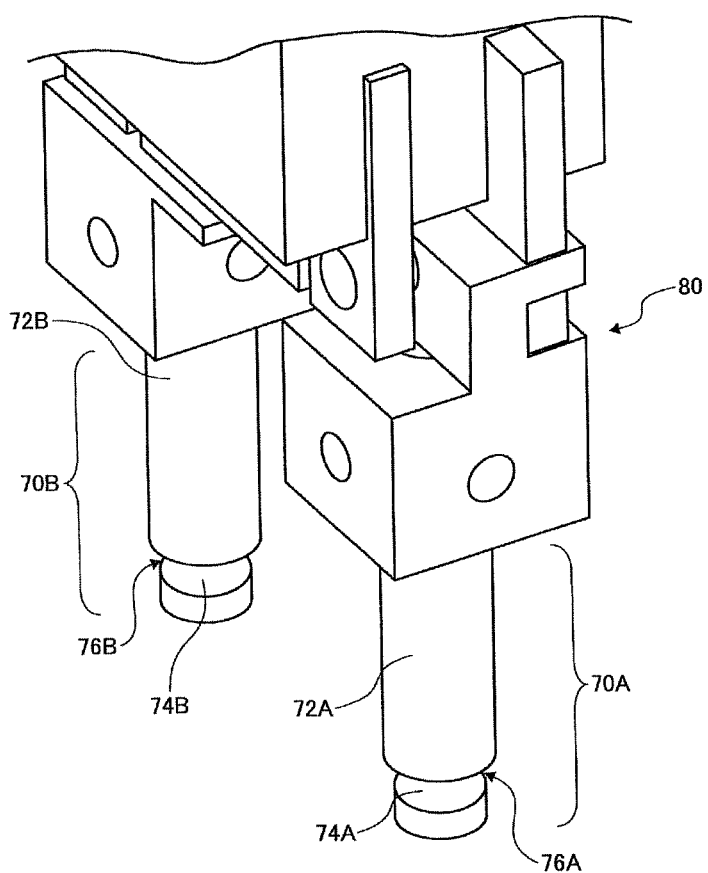
FIG. 6 is a schematic view illustrating an external configuration of a manufacturing apparatus 90 according to the first embodiment of the invention.

FIG. 6 is a schematic view illustrating an external configuration of the manufacturing apparatus 90 according to the first embodiment of the invention. The manufacturing apparatus 90 includes chuck pins 70A and 70B, and an actuator 80.

The chuck pins 70A and 70B respectively include main bodies 72A and 72B each having an approximately cylindrical shape and tapered portions 74A and 74B each having a partial conical shape. That is, the tapered portions 74A and 74B have cross-sectional radii that are gradually made smaller as the positions of the tapered portions 74A and 74B get closer to the main bodies 72A and 72B (see FIG. 8A). Cross-sectional radii (R2) of boundary portions 76A and 76B between the tapered portions 74A and 74B and the corresponding main bodies 72A and 72B are made smaller than radii (R1) of the first cutout portions 40A and 40B (see FIG. 8B). In practice, however, it is preferable that the entire tapered portions 74A and 74B have the cross-sectional radii (R2) smaller than the radii (R1) of the first cutout portions 40A and 40B. The actuator BO may be driven by air pressure to drive the chuck pins 70A and 70B in desired directions.

Figure 7:
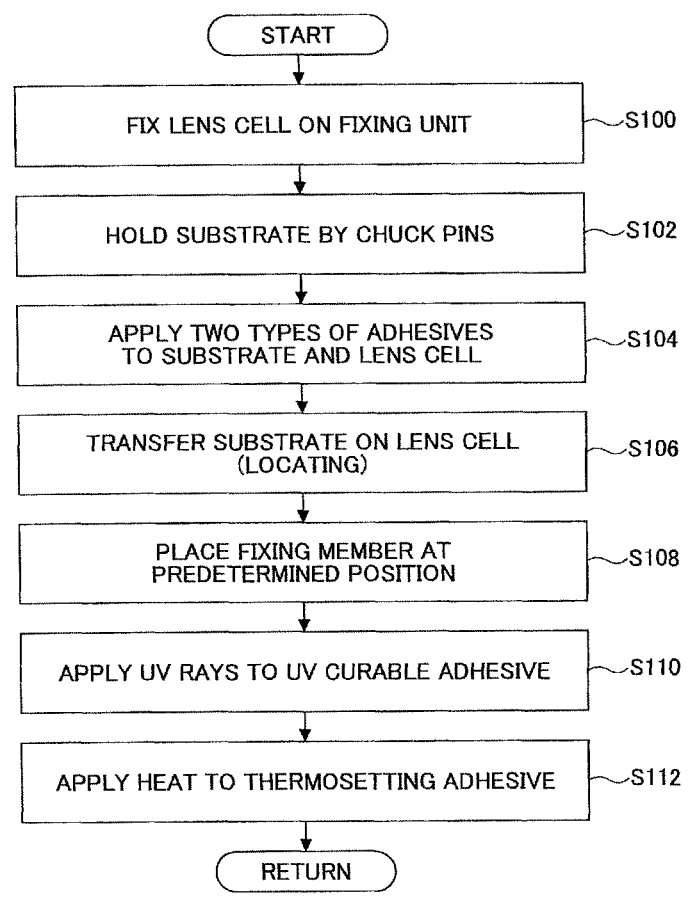
FIG. 7 is a flowchart illustrating steps of a method of manufacturing the image pickup apparatus 1 by the manufacturing apparatus 90.

FIG. 7 is a flowchart illustrating steps of a method of manufacturing the image pickup apparatus 1 by the manufacturing apparatus 90. The image pickup apparatus 1 is manufactured by the following steps.

First, the lens cell 20 is fixed on a not shown fixing unit of the manufacturing apparatus 90 (step S100). Note that the fixing unit may be formed as a separate unit from the manufacturing apparatus.

Figure 8B:
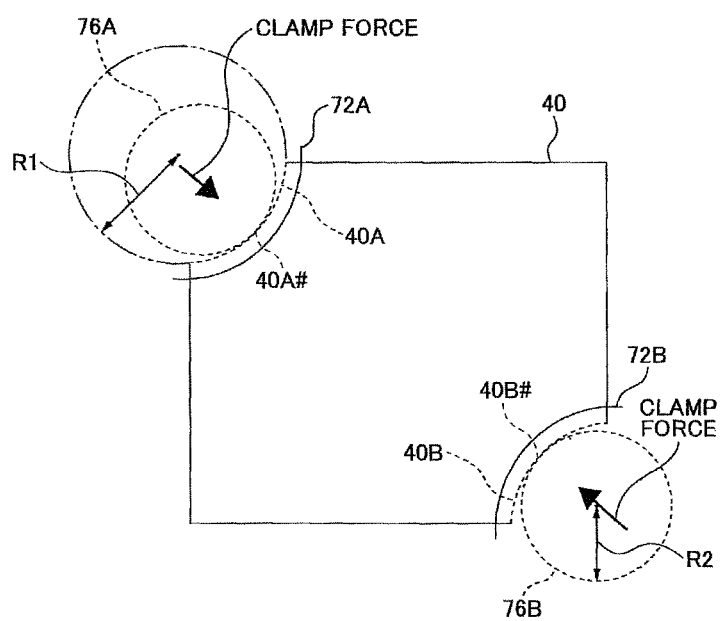

Subsequently, the substrate 40 is clamped by the two chuck pins 70A and 70B (step S102). FIGS. 8A and 8B are diagrams illustrating the substrate 40 clamped by the two chuck pins 70A and 70B viewed from different directions.

As illustrated in FIG. 8A, the tapered portions 74A and 74B are brought into contact with corresponding surfaces of the substrate 40 to apply pressure to them. In this process, the substrate 40 is gradually raised so as to contact the main bodies 72A and 72B. Accordingly, the substrate 40 is fixed to the manufacturing apparatus 90 such that the substrate 40 is located at a predetermined relative position in up-and-down directions (i.e., cylindrical axis directions of the chuck pins 70A and 70B) of the manufacturing apparatus 90.

As illustrated in FIG. 8B, since the substrate 40 is pressed or clamped by the boundary portions 76A and 76B having the radii (R2) smaller than the radii (R1) of the first cutout portions 40A and 40B, the boundary portions 76A and 76B come in contact with middle portions 40A# and 40B# of the first cutout portions 40A and 40B and are fixed to the contact positions. Accordingly, the substrate 40 is fixed to the manufacturing apparatus 90 such that the substrate 40 is located at a predetermined relative position in front-to-back and side-to-side directions (i.e., perpendicular to cylindrical axis directions of the chuck pins 70A and 70B) of the manufacturing apparatus 90.

That is, the substrate 40 is fixed to the manufacturing apparatus 90 such that the substrate 40 is located at a predetermined relative position in up-and-down, front-to-back and side-to-side directions. Accordingly, the positions of the substrate 40 and the image sensor 41 may be detected accurately by the driving condition of the actuator 80 in the manufacturing apparatus 90. Thus, the locating process of the substrate 40 can start from the condition where the substrate 40 is located approximately at an optimal ideal relative position in up-and-down, front-to-back and side-to-side directions in the manufacturing apparatus 90.

This can improve effectiveness of the manufacturing process. Further, since the manufacturing apparatus 90 can clamp the substrate 40 at the predetermined relative position in the up-and-down, front-to-back and side-to-side directions, positions on the lenses 10 through 15 relative to the image sensor 41 can be accurately determined.

Next, two types of adhesives, namely, the UV curable adhesive Aa and the thermosetting adhesive Ab are applied to the substrate 40 and the lens cell 20 (step S104). Note that the thermosetting adhesive Ab in the description of the first embodiment is omitted from the related figures. The UV curable adhesive Aa is applied to portions where the fixing member 45 is in contact with the substrate 40 and the lens cell 20 and the thermosetting adhesive Ab is applied to other portions to be bonded. Note that the UV curable adhesive Aa is applied both to the substrate 40 and the lens cell 20.

Figure 9:
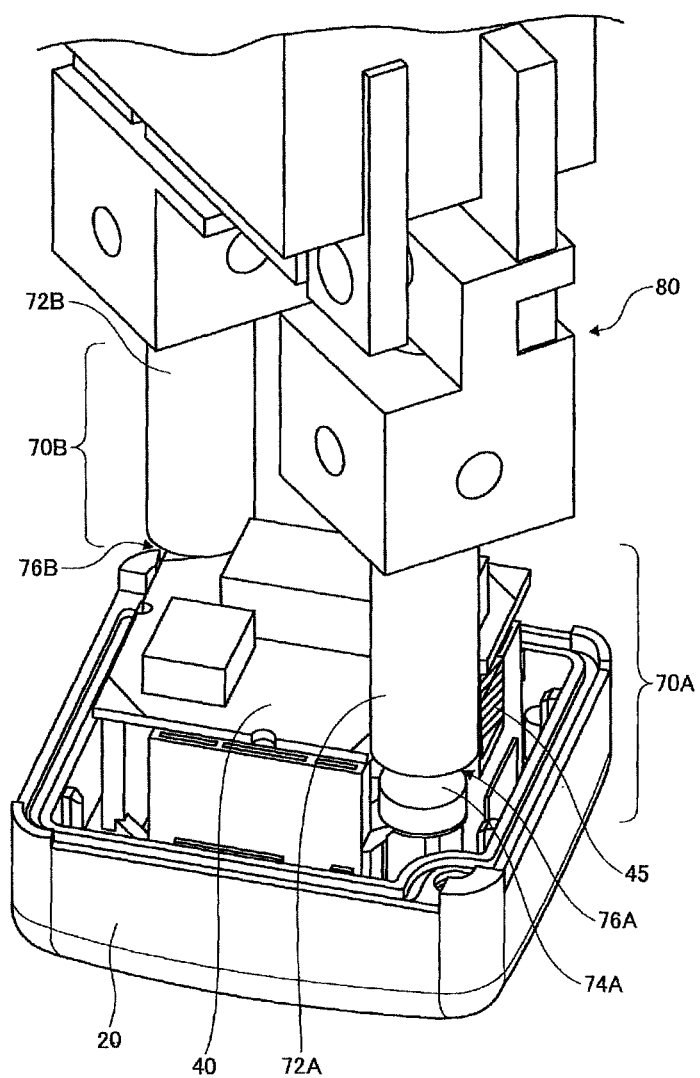
FIG. 9 is a view illustrating a locating process by the chuck pins 70A and 70B clamping the substrate 40.

Thereafter, the substrate 40 is transferred to an appropriate position of the lens cell 20 by a not shown transfer unit (step S106). When the substrate 40 is transferred to the appropriate position on the lens cell 20, the image sensor 41 is maintained in the conductive state. Accordingly, the positions on the lenses 10 through 15 relative to the image sensor 41 are finely adjusted while monitoring images captured by the image sensor 41. This process is defined as "locating". FIG. 9 is a view illustrating the "locating" process by the chuck pins 70A and 70B clamping the substrate 40. Note that the locating process is carried out by allowing the substrate 40 and the lens cell 20 to slide on the two types of adhesives applied to them.

When the locating process is completed, the fixing member 45 is placed at a predetermined position between the substrate 40 and the lens cell 20 (step S108). The UV curable adhesive Aa is then cured by the application of ultraviolet rays to fix the substrate 40 and the fixing member 45, and the lens cell 20 and the fixing member 45 (step S110).

When the UV curable adhesive Aa has been cured by the application of ultraviolet rays, the thermosetting adhesive Ab is cured by heating at an appropriate temperature (step S112), thereby ending a major process. Note that if the fixed members (substrate, lens cell, and fixing member) can be heated on the manufacturing apparatus 90, the heating may be carried out while they are placed on the manufacturing apparatus 90; or if not, the heating may be carried out after they are removed from the manufacturing apparatus 90.

Figure 10A:
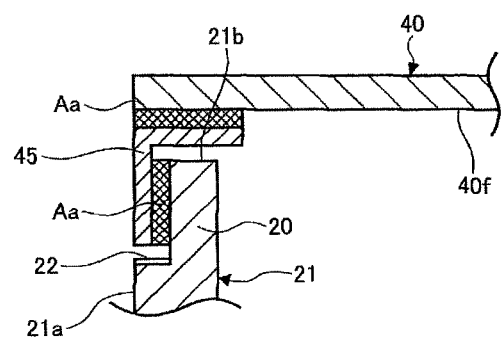
FIG. 10A is a schematic diagram illustrating a process of bonding via a fixing member 45 according to the first embodiment.

FIGS. 10A through 10D are schematic diagrams illustrating processes of bonding via fixing members. As illustrated in FIG. 10A, since the fixing member 45 has a cross section of an approximately L shape to fit in a recess portion 22 formed in the lens cell 20, the fixing member 45 is bonded to the lens cell 20 by fitting in the recess portion 22. Further, the fixing member 45 is attached such that a surface of the fixing member 45 facing the substrate 40 is arranged inwardly from an outer side surface 21a of the lens cell 20.

Figure 10B:
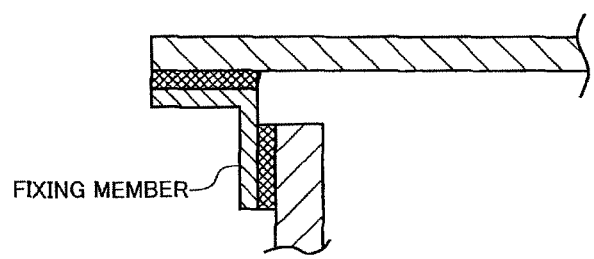
FIG. 10B is a schematic diagram illustrating a process of bonding via a fixing member according to the related art.

FIG. 10B is a diagram illustrating a bonding structure via a fixing member according to the related art. With the related art bonding structure, since the substrate is projected from the lens cell, the size of the image pickup apparatus is increased. However, with the bonding structure of the first embodiment as illustrated in FIG. 10A, the substrate 40 is not projected from the lens cell. Thus, it is possible to reduce the size of the image pickup apparatus 1.

Figure 10C:
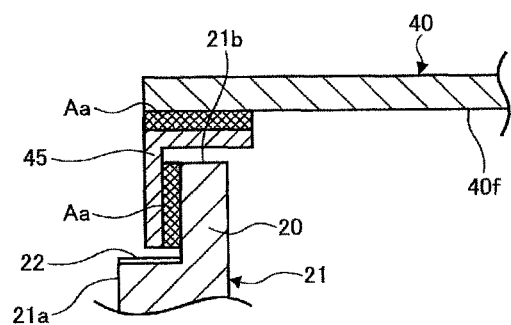
FIG. 10C is a schematic diagram illustrating another process of bonding via a fixing member 45 according to the first embodiment.

Note that the bonding structure of this embodiment may be formed such that the fixing member 45 and the outer side surface 21a of the lens cell 20 excluding the recess portion 22 form an approximately same plane as illustrated in FIG. 10A; however, it may alternatively be formed such that the fixing member 45 is located at a position inward from the outer side surface 21a of the lens cell 20 excluding the recess portion 22 as illustrated in FIG. 10C.

Figure 10D:
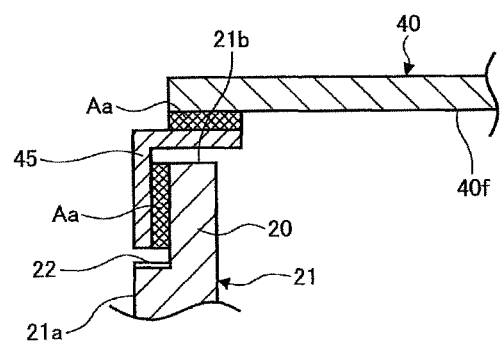
FIG. 10D is a schematic diagram illustrating still another process of bonding via a fixing member 45 according to the first embodiment.

Note also that the bonding structure of this embodiment may be formed such that an outer end surface of the substrate 40 is located on a line extended from the outer side surface 21a of the lens cell 20 excluding the recess portion 22 as illustrated in FIG. 10A; however, it may alternatively be formed such that the outer end surface of the substrate 40 is located at a position inward from the outer side surface 21a of the lens cell 20 excluding the recess portion 22 as illustrated in FIG. 10D.

That is, the fixing member 45 and the outer end surface of the substrate 40 are formed such that they are located in parallel with or at a position inward from the outer side surface 21a of the lens cell 20 excluding the recess portion 22. With this configuration, the size of the image pickup apparatus 1 may be reduced without having projected parts.

As described above, the UV curable adhesive Aa is used for the bonding of the substrate 40 to the lens cell 20 via the fixing member 45. Since the curing time of the UV curable adhesive Aa is shorter than that of the thermosetting adhesive Ab, the time for drying may not be required. Accordingly, it is possible to efficiently bond the substrate 40 to the lens cell 20 via the fixing member 45.

Further, the thickness of the UV curable adhesive Aa can be reduced by bonding the substrate 40 and the lens cell 20 via the fixing member 45, and the UV curable adhesive Aa applied between the substrate 40 and the fixing member 45 and also between the lens cell 20 and the fixing member 45 can simultaneously be cured. Accordingly, it is possible to decrease the positional deviation between the substrate 40 and the lens cell 20 due to the change in volume of the UV curable adhesive Aa caused by curing.

However, the UV curable adhesive Aa may not bond the above members (i.e., substrate, lens cell and fixing member) in areas where ultraviolet rays do not reach. Thus, the bonding strength may be insufficient if these members are bonded with the UV curable adhesive Aa alone. Note that Japanese Patent Application Publication No. 2006-80667 describes examples of bonding elements or members using the UV curable adhesive alone.

In this first embodiment, the thermosetting adhesive Ab is used in combination with the UV curable adhesive Aa to compensate for such insufficient bonding. Thus, the entire bonding strength may be increased by supplying the thermosetting adhesive Ab in the areas where ultraviolet rays do not reach. In this case, since the substrate 40 and the lens cell 20 are also bonded with the UV curable adhesive, it is unlikely to cause positional deviation between the substrate 40 and the lens cell 20 due to the change in volume of the thermosetting adhesive Ab caused by heat curing.

The image pickup apparatus 1 according to the first embodiment includes an indirect bonding structure portion SA where the substrate 40 and the lens cell 20 are indirectly bonded via the fixing member 45 with the UV curable adhesive Aa, and a filler bonding structure portion SB where the substrate 40 and the lens cell 20 are bonded by supplying the thermosetting adhesive Ab as filler between the substrate 40 and the lens cell 20.

Figure 11:
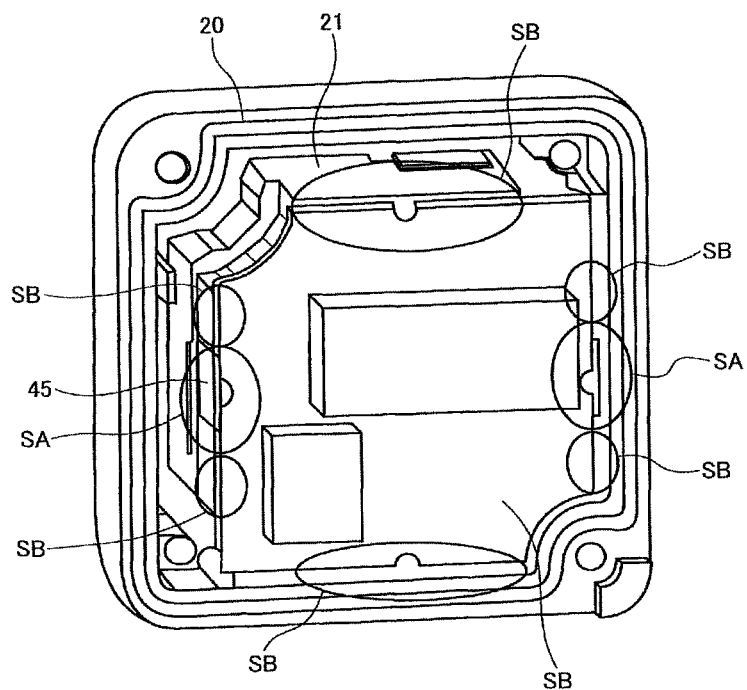
FIG. 11 is a diagram illustrating an example of a distribution of two types of bonding structure portions in the image pickup apparatus according to the first embodiment.

FIG. 11 is a diagram illustrating an example of a distribution of such two types of bonding structure portions SA and SB in the image pickup apparatus according to the first embodiment. As illustrated in FIG. 11, two fixing members 45 are bonded between the lens cell 20 and the substrate 40 facing the lens cell 20 with the UV curable adhesion Aa to form the indirect bonding structure portions SA. The thermosetting adhesive Ab is supplied as filler in the vicinity of the fixing members 45 and an outer periphery of the substrate 40 excluding the first cutout portions 40A and 40B to form the filler bonding structure portions SB. With this configuration, the bonding of the substrate 40 and the lens cell 20 can be sufficiently strong.

In the image pickup apparatus 1 according to the first embodiment, since the manufacturing apparatus 90 can clamp the substrate 40 at a predetermined relative position, the locating process of the substrate 40 can start from an approximately optimal relative position, thereby improving the efficiency in a manufacturing process. In addition, positions on the lenses 10 through 15 relative to the image sensor 41 can be accurately determined.

Further, the image pickup apparatus 1 according to the first embodiment includes the indirect bonding structure portions SA formed by bonding the lens cell 20 and the substrate 40 via two fixing members 45 with the UV curable adhesion Aa, and the filler bonding structure portions SB formed by supplying the thermosetting adhesive Ab in the vicinity of the fixing members 45 and an outer periphery of the substrate 40 excluding the first cutout portions 40A and 40B, so that the bonding of the substrate 40 and the lens cell 20 can be sufficiently strong.

Other Embodiments

Other embodiments will be described below. Since the following embodiments are modifications of the first embodiment, the differences between the modifications and the first embodiment will be described, and descriptions of components identical to those of the first embodiment are omitted by giving the same reference numerals.

Second Embodiment

Figure 12:
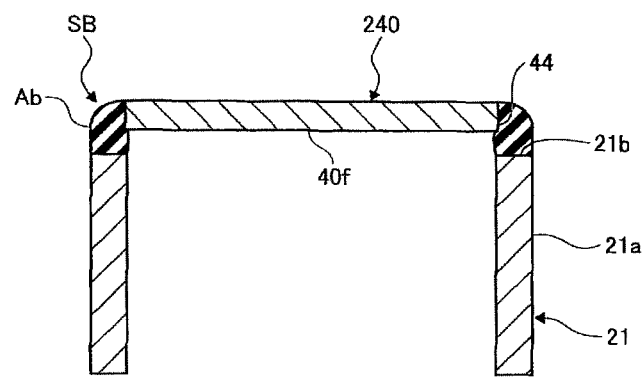
FIG. 12 is a cross-sectional diagram illustrating connecting portions provided between a supporting wall 21 and a substrate 240 in an image pickup apparatus according to a second embodiment of the invention cut along a S12-S12 line in FIG. 13.
Figure 13:
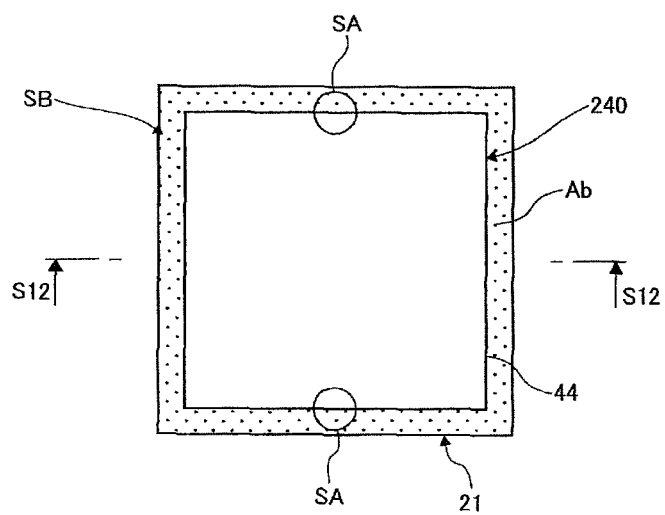
FIG. 13 is a diagram illustrating the connecting portions provided between the supporting wall 21 and the substrate 240 viewed from behind the back surface of the image pickup apparatus according to the second embodiment of the invention.

First, a second embodiment is described. As illustrated in FIGS. 12 and 13, an outer side surface 44 of the substrate 240 is made slightly smaller than the outer side surface 21a of the supporting wall 21 (of the lens cell 20). This point is the same as the first embodiment as illustrated in FIGS. 10C and 10D.

According to the second embodiment, the filler bonding structure portions SB (see FIG. 11) are configured such that the supporting wall 21 having a rear end surface 21b that faces a front surface 40f of a substrate 240 and an outer side surface 44 of the substrate 240 are bonded by supplying the thermosetting adhesive Ab as filler between the rear end surface 21b of the supporting wall 21 and the outer side surface 44 of the substrate 240.

Note that in FIGS. 12 and 13 illustrating the second embodiment, the indirect bonding structure portions SA (not shown, but provided positions are indicated by SA in FIG. 13) are provided in combination with the filler bonding structure portions SB in the same manner as the first embodiment.

In the second embodiment, the manufacturing process is partially different from that of the first embodiment. Specifically, in the second embodiment, the UV curable adhesive Aa is applied between the substrate 240 and the fixing member 45 and the lens cell 20 and the fixing member 45, and the applied UV curable adhesive Aa is cured by the application of UV rays, thereby initially forming the indirect bonding structure portions SA. Thereafter, the thermosetting adhesive Ab is applied between the substrate 240 and the supporting wall 21 of the lens cell 20, and the applied thermosetting adhesive Ab is cured by the application of heat, thereby forming the filler bonding structure portions SB.

In this process, the rear end surface 21b of the supporting wall 21 is placed in an upward direction when the thermosetting adhesive Ab is applied. In this case, the end surface 21b of the supporting wall 21 is exposed in two directions; namely, a front direction (upward direction) of the rear end surface 21b and a front direction (side direction) of the outer side surface 44 of the substrate 240. Accordingly, the thermosetting adhesive Ab can be applied from upper side and lateral side directions, thereby improving workability.

Moreover, dripping of the thermosetting adhesive Ab applied to the outer side surface 44 of the substrate 240 can be received by the rear end surface 21b of the supporting wall 21, thereby preventing the thermosetting adhesive Ab from dripping farther out to the outer side surface 21a of the supporting wall 21. Therefore, working hours for the manufacturing process, such as re-application of the adhesive, may be reduced.

Further, since the thermosetting adhesive Ab is applied after the indirect bonding structure portions SA are formed by curing the UV curable adhesive, the thermosetting adhesive Ab and the UV curable adhesive Aa are prevented from mixing before being cured. Accordingly, decrease in the bonding strength due to the mixing of the two types of adhesives may also be prevented.

Third Embodiment

Figure 14:
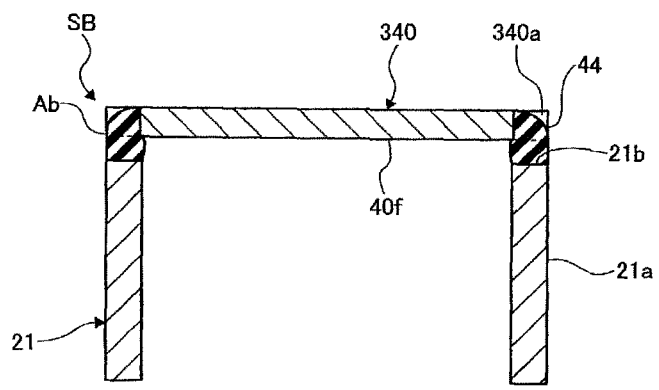
FIG. 14 is a cross-sectional diagram illustrating the connecting portions between the supporting wall 21 and the substrate 340 in an image pickup apparatus according to a third embodiment of the invention cut along a S14-S14 line in FIG. 15.
Figure 15:
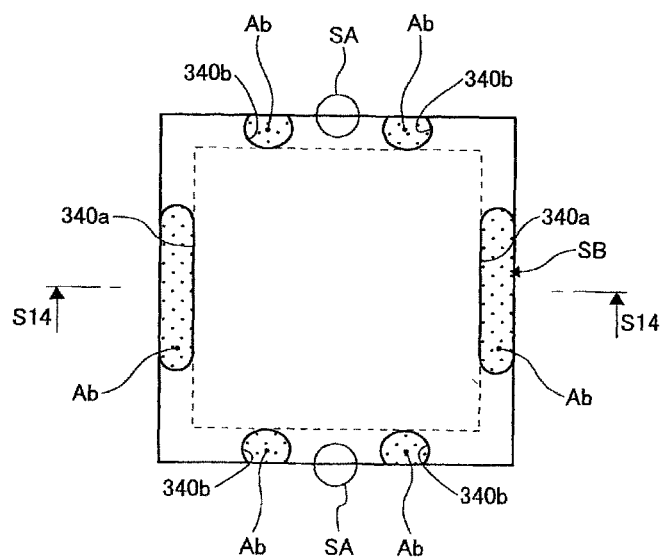
FIG. 15 is a diagram illustrating the connecting portions provided between the supporting wall 21 and the substrate 340 viewed from behind the back surface of the image pickup apparatus according to the third embodiment of the invention.

Subsequently, a third embodiment is described. In this third embodiment, as illustrated in FIG. 14, the outer side surface 44 of the substrate 340 is located in an approximately the same line with the outer side surface 21a of the supporting wall 21 (of the lens cell 20). Further, third cutout portions 340a and 340b (adhesive filling cutout portions) are formed in an outer periphery of the substrate 340, avoiding the indirect bonding structure portions SA. In the areas where the third cutout portions 340a and 340b are formed, the thermosetting adhesive Ab is applied to the rear end surface 21b of the supporting wall 21 and side surfaces of the third cutout portions 340a and 340b of the substrate 340. Note that in the areas where no third cutout portions 340a and 340b are formed, the thermosetting adhesive Ab may be applied between the rear end surface 21b of the supporting wall 21 and a front surface 40f of the substrate 340, or the thermosetting adhesive Ab bonding may entirely be omitted. Further, the indirect bonding structure portions SA are arranged in positions indicated by "SA" between the third cutout portions 340b.

In the third embodiment, the UV curable adhesive Aa is applied between the substrate 340 and the fixing member 45 and the lens cell 20 and the fixing member 45, and the applied UV curable adhesive Aa is cured by the application of UV rays, thereby initially forming the indirect bonding structure portions SA; and thereafter, the thermosetting adhesive Ab is applied between the substrate 340 and the supporting wall 21 of the lens cell 20, and the applied thermosetting adhesive Ab is cured by the application of heat, thereby forming the filler bonding structure portions SB, in the same manner as the second embodiment.

In this process, as illustrated in FIG. 14, the rear end face 21b of the supporting wall 21 is placed in an upward direction when the thermosetting adhesive Ab is applied in the same manner as the second embodiment. Accordingly, in the areas where the third cutout portions 340a and 340b are formed, the thermosetting adhesive Ab can be applied from upper side and lateral side directions, thereby improving workability. Further, in the third embodiment, a total area of the thermosetting adhesive Ab that is in contact with the outer side surface 44 of the substrate 340 is increased. Accordingly, dripping of the thermosetting adhesive Ab on the outer side surface 21a of the supporting wall 21 can be prevented by the surface tension of the thermosetting adhesive Ab. Moreover, in the areas where the third cutout portions 340a and 340b are formed, the dripping of the thermosetting adhesive Ab can be received by the rear end surface 21b of the supporting wall 21, thereby preventing the thermosetting adhesive Ab from dripping on the outer side surface 21a of the supporting wall 21. Therefore, working hours for the manufacturing process, such as re-application of the adhesive, may be reduced. In addition, the bonding strength may be increased as the contact area of the thermosetting adhesive Ab is increased by providing the third cutout portions 340a and 340b in the substrate 340.

Further, since the thermosetting adhesive Ab is applied after the indirect bonding structure portions SA are formed by curing the UV curable adhesive, the thermosetting adhesive Ab and the UV curable adhesive Aa are prevented from mixing before being cured. Accordingly, decrease in the bonding strength due to the mixing of the two types of adhesives may also be prevented, in the same manner as the second embodiment.

Fourth Embodiment

Figure 16:
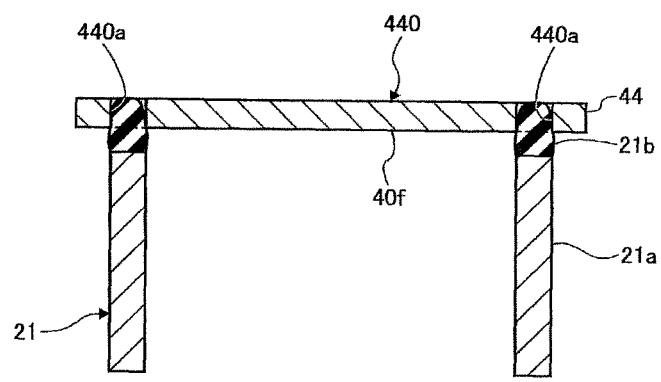
FIG. 16 is a cross-sectional diagram illustrating the connecting portions between the supporting wall 21 and the substrate 440 in an image pickup apparatus according to a fourth embodiment of the invention cut along a line S16-S16 in FIG. 17.
Figure 17:
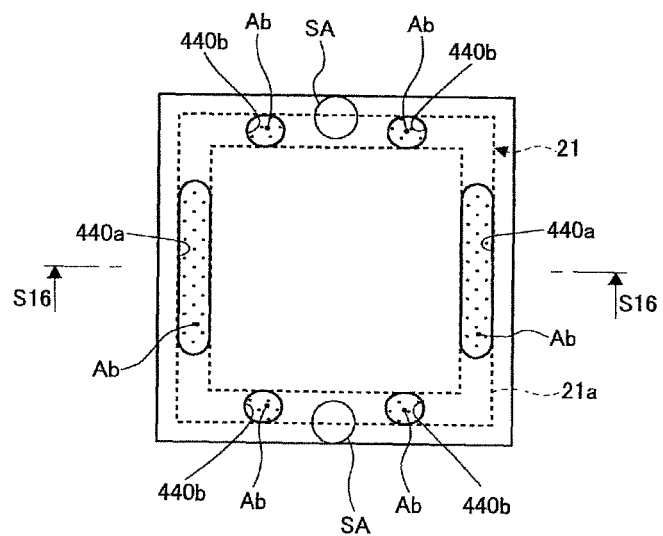
FIG. 17 is a diagram illustrating the connecting portions provided between the supporting wall 21 and the substrate 440 viewed from behind the back surface of the image pickup apparatus according to the fourth embodiment of the invention.

Next, a fourth embodiment is described. The fourth embodiment is a modification of the third embodiment. As illustrated in FIGS. 16 and 17, the fourth embodiment includes fourth cutout portions 440a and 440b in place of the third cutout portions 340a and 340b. The fourth cutout portions 440a and 440b are provided in a substrate 440 at positions where the rear end surface 21b of the supporting wall 21 faces the substrate 440. That is, the fourth cutout portions 440a and 440b are provided at the positions in an inner side direction from the outer side surface of the substrate 440.

In the fourth embodiment, as illustrated in FIGS. 16 and 17, the substrate 440 is formed such that the outer side surface 44 of the substrate 440 is slightly projected from the outer side surface 21a of the supporting wall 21 as similar to the case shown in FIG. 10B of the related art, and thermosetting adhesive Ab is applied between the rear end surface 21b of the supporting wall 21 and a front surface 40f of the substrate 440. In the areas where the fourth cutout portions 440a and 440b are formed, the thermosetting adhesive Ab is supplied in the fourth cutout portions 440a and 440b and bonded on inner surfaces of the fourth cutout portions 440a and 440b and the rear end surface 21b of the supporting wall 21. Note that in the areas where no fourth cutout portions 440a and 440b are formed, the thermosetting adhesive Ab may be applied between the rear end surface 21b of the supporting wall 21 and a front surface 40f of the substrate 440, or the thermosetting adhesive Ab bonding may be omitted. Further, the indirect bonding structure portions SA are arranged in positions indicated by "SA" between the fourth cutout portions 440b in FIG. 17.

In the fourth embodiment, the UV curable adhesive Aa is applied between the substrate 440 and the fixing member 45 and the lens cell 20 and the fixing member 45, and the applied UV curable adhesive Aa is cured by the application of UV rays, thereby initially forming the indirect bonding structure portions SA; and thereafter, the thermosetting adhesive Ab is applied between the substrate 440 and the supporting wall 21 of the lens cell 20, and the applied thermosetting adhesive Ab is cured by the application of heat, thereby forming the filler bonding structure portions SB, similar to the second and third embodiments.

In this process, as illustrated in FIG. 16, the rear end face 21b of the supporting wall 21 is placed in an upward direction when the thermosetting adhesive Ab is applied. Accordingly, in the areas where the third cutout portions 440a and 440b are formed, the thermosetting adhesive Ab can be applied from an upper side direction, thereby improving workability.

Further, in the third embodiment, a total area of the thermosetting adhesive Ab that is in contact with the fourth cutout portions 440a and 440b of the substrate 440 is increased. Accordingly, dripping of the thermosetting adhesive Ab on the outer side surface 21a of the supporting wall 21 can be prevented by the surface tension of the thermosetting adhesive Ab. In addition, when the thermosetting adhesive Ab is supplied from an upward direction into the fourth cutout portions 440a and 440b, the thermosetting adhesive Ab is received by the rear end surface 21b of the supporting wall 21, thereby preventing the thermosetting adhesive Ab from dripping. Therefore, working hours for the manufacturing process, such as re-application of the adhesive, may be reduced, and the bonding strength may be increased.

Further, since the thermosetting adhesive Ab is applied after the indirect bonding structure portions SA are formed by curing the UV curable adhesive, the thermosetting adhesive Ab and the UV curable adhesive Aa are prevented from mixing before being cured. Accordingly, decrease in the bonding strength due to the mixing of the two types of adhesives may also be prevented, in the same manner as the second embodiment.

Fifth Embodiment

Next, a fifth embodiment is described. In the fifth embodiment, filling type recess portions 24a, 24b and 24c shown in FIG. 18, FIG. 19, and FIG. 20, respectively are formed in the rear end surface 21b of the supporting wall 21 in forward directions of the image pickup apparatuses.

Figure 18:
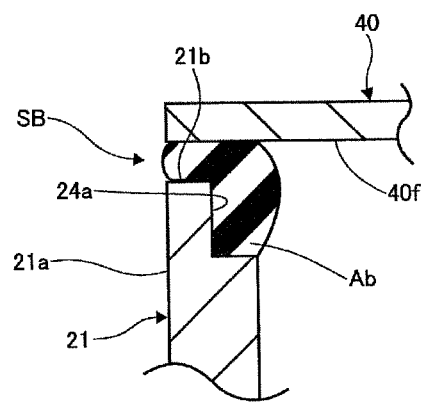
FIG. 18 is a cross-sectional diagram illustrating a connecting portion provided between the supporting wall 21 and the substrate 40 in the image pickup apparatus according to a fifth embodiment of the invention.
Figure 19:
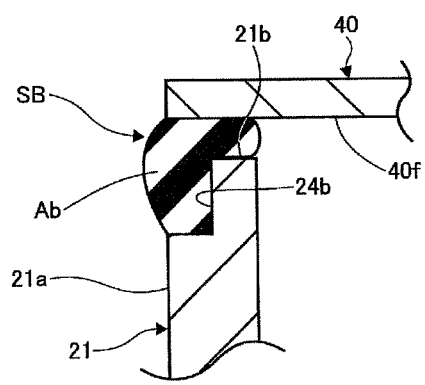
FIG. 19 is a cross-sectional diagram illustrating the connecting portion provided between the supporting wall 21 and the substrate 40 in the image pickup apparatus according to the fifth embodiment of the invention.
Figure 20:
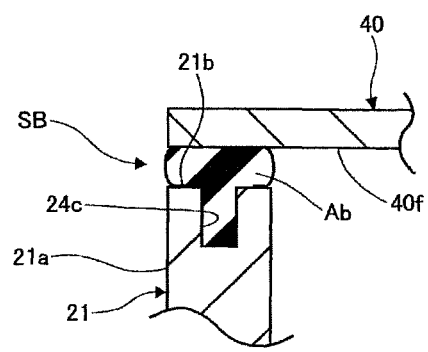
FIG. 20 is another cross-sectional diagram illustrating the connecting portion provided between the supporting wall 21 and the substrate 40 in the image pickup apparatus according to the fifth embodiment of the invention.
Figure 21:
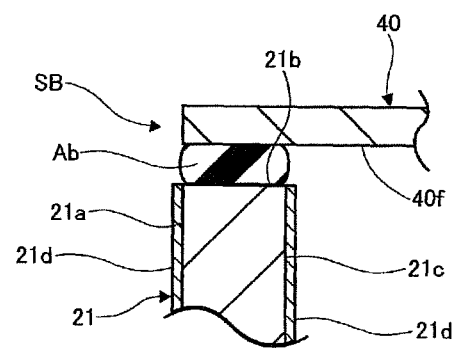
FIG. 21 is a cross-sectional diagram illustrating a connecting portion provided between the supporting wall 21 and the substrate 40 in the image pickup apparatus according to a sixth embodiment of the invention.

In FIG. 18, the filling type recess portion 24a is formed in the rear end surface 21b of the supporting wall 21 so as to be exposed to an inner peripheral surface of the supporting wall 21. In FIG. 19, the filling type recess portion 24b is formed in the rear end surface 21b of the supporting wall 21 so as to be exposed to outside of the supporting wall 21. In FIG. 20, the filling type recess portion 24c is formed in the middle of the rear end surface 21b of the supporting wall 21.

In the filler bonding structure portion SB according to the fifth embodiment, the thermosetting adhesive Ab is supplied in the filling type recess portion 24a, 24b, or 24c to bond the rear end surface 21b of the supporting wall 21 and the front surface 40f of a substrate 40.

In the fifth embodiment, a bonding area of the thermosetting adhesive Ab with the supporting wall 21 is increased thereby increasing the bonding strength. In addition, a retaining force for retaining the thermosetting adhesive Ab on the rear end surface 21b of the supporting wall 21 is also increased. Accordingly, the thermosetting adhesive Ab can be prevented from dripping along the supporting wall 21, thereby reducing working hours for the manufacturing process, such as re-application of the adhesive.

Sixth Embodiment

Next, a sixth embodiment is described. In the sixth embodiment, an outer side surface 21a and an inner side surface 21c of the supporting wall 21 include dripping preventing treatment portions 21d. In the sixth embodiment, the dripping preventing treatment portions 21d are formed by fluorinating the outer side surface 21a and the inner side surface 21c of the supporting wall 21; however, if the lens cell is metallic, the dripping preventing treatment portions 21d are formed by mirror finishing them.

Accordingly, in the sixth embodiment, if the adhesives Aa and Ab are about to drip from the rear end surface 21b, it is difficult for the adhesives Aa and Ab to slide on the outer side surface 21a and the inner side surface 21c of the supporting wall 21, thereby preventing the adhesives Aa and Ab from dripping. Therefore, working hours for the manufacturing process, such as re-application of the adhesive, may be reduced.

In the following, various advantages of the disclosed embodiments will be noted.

According to one embodiment, the relative position of the substrate and the two substrate clamping members can be accurately detected by clamping the approximately arc-shaped location cutout portions by the two clamping members having a cylindrical surface. As a result, the efficiency in the manufacturing process can be improved, and the relative positional relationship between the lens and the image pickup element is accurately determined. Further, since the lens cell and the substrate are bonded via the indirect bonding structure portion where the lens cell and substrate are bonded via the fixing member with the ultraviolet curable adhesive and the filler bonding structure portion where the first and second members are bonded by supplying the thermosetting adhesive therebetween, the lens cell and substrate can accurately bonded with sufficiently high bonding strength.

Moreover, the lens cell includes a recess portion in an outer side surface, and the lens cell and the fixing member are bonded such that the fixing member fits in the recess portion. With this configuration, the size of the image pickup apparatus can be reduced.

According to another embodiment, the image pickup apparatus includes the lens cell holding the lens and the substrate having an approximately rectangular shape and holding the image pickup element converting the image formed via the lens into the electric signal. In the image pickup apparatus, the lens cell and the substrate are bonded, and the substrate has an approximately rectangular shape and includes two approximately arc-shaped location cutout portions at respective diagonal corners. With this configuration, the relative position of the substrate and the two substrate clamping members can be accurately detected by clamping the approximately arc-shaped location cutout portions with the two clamping members having a cylindrical surface. As a result, the efficiency in the manufacturing process can be improved, and the relative positional relationship between the lens and the image pickup element is accurately determined.

Further, the lens cell and the substrate are bonded via the indirect bonding structure portion where the lens cell and the substrate are bonded via the fixing member with the UV curable adhesive and the filler bonding structure portion where the lens cell and the substrate are bonded by supplying the thermosetting adhesive between them. With this configuration, the bonding of the substrate and the lens cell 20 can be sufficiently strong.

According to another embodiment, the substrate is clamped by the chuck pins such that the approximately arc-shaped location cutout portions of the substrate come in contact with and are fixed to the boundary portions between the main bodies and tapered portions of the chuck pins. Accordingly, the relative positional relationship between the chuck pins and the substrate can be accurately detected. As a result, the efficiency in the manufacturing process can be improved, and the relative positional relationship between the lens and the image pickup element is accurately determined.

According to another embodiment, since the manufacturing apparatus includes the two chuck pins capable of clamping the substrate, the substrate is clamped by the two chuck pins such that the approximately arc-shaped location cutout portions of the substrate come in contact with and fixed to the boundary portions between the main bodies and tapered portions of the chuck pins. Accordingly, the relative positional relationship between the chuck pins and the substrate can be accurately detected. As a result, the efficiency in the manufacturing process can be improved, and the relative positional relationship between the lens and the image pickup element is accurately determined.

According to another embodiment, the image pickup apparatus includes the lens cell holding the lens and the substrate having an approximately rectangular shape and holding the image pickup element converting the image formed via the lens into the electric signal. In the image pickup apparatus, the lens cell and the substrate are bonded via the indirect bonding structure portion where the lens cell and the substrate are bonded via the fixing member with the UV curable adhesive and the filler bonding structure portion where the lens cell and the substrate are bonded by supplying the thermosetting adhesive therebetween. With this configuration, the bonding of the substrate and the lens cell can be sufficiently strong.

According to another embodiment, the ultraviolet curable adhesive is used in the indirect bonding structure portion, and the thermosetting adhesive is used in the filler bonding structure portion. With this configuration, the lens cell and substrate can be accurately bonded with sufficiently high bonding strength.

According to another embodiment, the fixing member includes a cross section of an approximately L-shape. With this configuration, the size of the image pickup apparatus can be reduced.

According to another embodiment, the thermosetting adhesive used for the filler bonding structure portion is in contact with the outer side surface of the substrate and the lens cell surface facing the substrate, the two surfaces facing different directions. Accordingly, the thermosetting adhesive can be applied from the two different directions opposed to the two surfaces, and moreover, the dripping of thermosetting adhesive from one of the two surfaces can be prevented with the surface tension of the thermosetting adhesion by arranging the other surface in a direction of the thermosetting adhesive dripping from the one of the two surfaces. Therefore, working hours for the manufacturing process, such as re-application of the adhesive, may be reduced.

According to another embodiment, the lens cell includes the filling type recess portion in the surface thereof facing the mounting surface of the substrate on which the image pickup element is mounted, and in the filler bonding structure portion, the filling type recess portion of the lens cell is supplied with the thermosetting adhesive. With this configuration, the retaining force for retaining the thermosetting adhesive on the lens cell is increased. Accordingly, the thermosetting adhesive can be prevented from dripping. In addition, the lens cell and the substrate can be accurately bonded with sufficient bonding strength, and working hours for the manufacturing process, such as re-application of the adhesive, can be reduced. Further, with this configuration, since the contact area of the thermosetting adhesive with the lens cell having the filling type recess portion can be increased in comparison to the lens cell having no filling type recess portion, the bonding strength can be increased.

According to another embodiment, in the filler bonding structure portion, the adhesive filling cutout portion to be filled with the thermosetting adhesive is formed in the outer periphery of the substrate. With this configuration, the thermosetting adhesive can be applied in two directions in the areas of the lens cell where the cutout portions are formed; namely, in a direction opposite to the surface of the substrate where the image pickup element is mounted and in a direction of the thermosetting adhesive bonding side surface of the lens cell, thereby improving workability in the application of the adhesive. Further, in the areas of the lens cell where the cutout portions are formed, the retaining force for retaining the thermosetting adhesive on the lens cell is increased. Accordingly, the thermosetting adhesive can be prevented from dripping. In addition, the lens cell and the substrate can be accurately bonded with sufficient bonding strength, and working hours for the manufacturing process, such as re-application of the adhesive, can be reduced. Further, since the contact area of the thermosetting adhesive with the substrate having the adhesive filling cutout portion can be increased in comparison to the substrate having no adhesive filling cutout portion, the bonding strength can be increased.

According to another embodiment, in the filler bonding structure portion, the adhesive filling cutout portion to be filled with the thermosetting adhesive is formed in the substrate. With this configuration, the thermosetting adhesive can be applied via the cutout portion formed in the substrate in a direction opposite to the surface of the substrate where the image pickup element is mounted, thereby improving workability in the application of the adhesive. Further, since the thermosetting adhesive is supplied in the adhesive filling cutout portion, the dripping of the thermosetting adhesive can be prevented by the surface tension of the thermosetting adhesive. Accordingly, the lens cell and the substrate can be accurately bonded with sufficient bonding strength, and working hours for the manufacturing process, such as re-application of the adhesive, can be reduced. Moreover, since the contact area of the thermosetting adhesive with the substrate having the adhesive filling cutout portion can be increased in comparison to the substrate having no adhesive filling cutout portion, the bonding strength can be increased.

According to another embodiment, the lens cell includes the dripping preventing treatment portion on the side surface thereof. With this configuration, the dripping of the thermosetting adhesive on the lens cell can be prevented by the dripping preventing treatment portion provided on the side surface thereof. In addition, the lens cell and the substrate can be accurately bonded with sufficient bonding strength, and working hours for the manufacturing process, such as re-application of the adhesive, can be reduced. Note that examples of the dripping preventing treatment include fluorinating a molded material or mirror finishing a metallic material.

According to another embodiment, an on-vehicle image pickup apparatus includes the aforementioned image pickup apparatus. With this configuration, the on-vehicle image pickup apparatus has excellent accuracy in bonding the lens cell and the substrate with sufficient bonding strength, and exhibits excellent workability in the application of thermosetting adhesive and excellent cost reduction in reducing working hours for the manufacturing process.

According to another embodiment, there is provided the image pick up apparatus capable of having accurately determined a relative positional relationship between the lens and the image pickup element, and the apparatus and the method for manufacturing such an image pickup apparatus more efficiently.

The disclosed embodiments are industrially applicable in a field of the manufacturing camera utilizing CCD or CMOS technology.

The descriptions of exemplary embodiments for implementing the invention have been provided heretofore. The present invention is not limited to these embodiments, but various variations and modifications may be made without departing from the scope of the present invention.

The present application is based on Japanese Patent Application No. 2009-096010, filed on Apr. 10, 2009, and Japanese Patent Application No. 2009-278632, filed on Dec. 8, 2009, the entire contents of which are hereby incorporated by reference.

What is claimed is:

1. An image pickup apparatus comprising:
a first member holding a lens, the first member having a recess portion in an outer side surface thereof; and
a second member holding an image pickup element converting an image formed via the lens into an electric signal, the second member having a rectangular shape and two arc-shaped location cutout portions at respective diagonal corners of the rectangular shape,
wherein the first and the second members are bonded via an indirect bonding structure portion where the first and second members are bonded via a fixing member with an ultraviolet curable adhesive and a filler bonding structure portion where the first and second members are bonded by supplying a thermosetting adhesive therebetween,
wherein the fixing member includes a cross section of an L-shape, and
wherein the first member and the second member are respectively disposed such that an outer edge of the second member does not project beyond the recess portion in the outer side surface of the first member in an outward direction.

2. The image pickup apparatus as claimed in claim 1, wherein the first member and the fixing member are bonded such that the fixing member fits in the recess portion thereof.

3. The image pickup apparatus as claimed in claim 1, wherein the second member is a substrate on which electronic components are mounted excluding predetermined areas at the respective diagonal corners at which the arc-shaped location cutout portions are formed.

4. An image pickup apparatus comprising:
a first member holding a lens, the first member having a recess portion in an outer side surface thereof;
a second member holding an image pickup element converting an image formed via the lens into an electric signal, the first and the second members being bonded,
wherein the second member has a rectangular shape and includes two arc-shaped location cutout portions at respective diagonal corners thereof,
wherein the first and second members are bonded via an indirect bonding structure portion where the first and second members are bonded via a fixing member with an ultraviolet curable adhesive and a filler bonding structure portion where the first and second members are bonded by supplying a thermosetting adhesive therebetween,
wherein the fixing member includes a cross section of an L-shape, and
wherein the first member and the second member are respectively disposed such that an outer edge of the second member does not project beyond the recess portion in the outer side surface of the first member in an outward direction.

5. The image pickup apparatus as claimed in claim 4, wherein the first and the second members are bonded via an indirect bonding structure portion where the first and second members are bonded via a fixing member with a first adhesive and a filler bonding structure portion where the first and second members are bonded by supplying a second adhesive therebetween.

6. An image pickup apparatus comprising:
a first member holding a lens, the first member having a recess portion in an outer side surface thereof; and
a second member having a rectangular shape and holding an image pickup element converting an image formed via the lens into an electric signal,
wherein the first and the second members are bonded via an indirect bonding structure portion where the first and second members are bonded via a fixing member with a first adhesive and a filler bonding structure portion where the first and second members are bonded by supplying a second adhesive therebetween,
wherein the fixing member includes a cross section of an L-shape, and
wherein the first member and the second member are respectively disposed such that an outer edge of the second member does not project beyond the recess portion in the outer side surface of the first member in an outward direction.

7. The image pickup apparatus as claimed in claim 6, wherein
the first adhesive used in the indirect bonding structure portion is an ultraviolet curable adhesive, and
the second adhesive used in the filler bonding structure portion is a thermosetting adhesive.

8. The image pickup apparatus as claimed in claim 1, wherein
the second member is a substrate on which the image pickup element is mounted, and
in the filler bonding structure portion, the thermosetting adhesive is supplied such that the thermosetting adhesive is in contact with an outer side surface of the substrate and a surface of the first member facing a mounting surface of the substrate on which the image pickup element is mounted.

9. The image pickup apparatus as claimed in claim 1, wherein
the second member is a substrate on which the image pickup element is mounted,
the first member includes a filling type recess portion in a surface thereof facing a mounting surface of the substrate on which the image pickup element is mounted, and
in the filler bonding structure portion, the filling type recess portion of the first member is supplied with the thermosetting adhesive.

10. The image pickup apparatus as claimed in claim 1, wherein
the second member is a substrate on which the image pickup element is mounted, and
in the filler bonding structure portion, an adhesive filling cutout portion to be filled with the thermosetting adhesive is formed in an outer periphery of the substrate.

11. The image pickup apparatus as claimed in claim 1, wherein
the second member is a substrate on which the image pickup element is mounted, and
in the filler bonding structure portion, an adhesive filling cutout portion to be filled with the thermosetting adhesive is formed in the substrate.

12. The image pickup apparatus as claimed in claim 1, wherein the first member includes a dripping preventing treatment portion on a side surface thereof.

13. An on-vehicle image pickup apparatus comprising the image pickup apparatus as claimed in claim 1.

14. The image pickup apparatus as claimed in claim 1, wherein the fixing member has a cross section of an L-shape, and the L-shaped fixing member is bonded to a mounting surface of the second member on which the image pickup element is mounted.

15. The image pickup apparatus as claimed in claim 1, wherein the fixing member has a cross section of an L-shape, and one leg of the L-shaped fixing member fits inside the recess portion of the first member.

16. The image pickup apparatus as claimed in claim 1, wherein the fixing member has a cross section of an L-shape, and the L-shaped fixing member is bonded to a side of the recess portion which is perpendicular to the outer side surface of the first member.

17. The image pickup apparatus as claimed in claim 1, wherein the first member has a rear end surface that is perpendicular to the outer side surface, and the recess portion of the first member is formed in both the outer side surface and the rear end surface of the first member.

* * * * *